United States Patent Office 3,522,180
Patented July 28, 1970

3,522,180
LUBRICATING OIL COMPOSITIONS CONTAINING AMORPHOUS ETHYLENE-PROPYLENE COPOLYMERS
William M. Sweeney, Wappingers Falls, David D. Reed, Lagrangeville, and Elmer E. Schallenberg, Fishkill, N.Y., assignors to Texaco Inc., New York, N.Y., a corporation of Delaware
No Drawing. Filed Sept. 28, 1967, Ser. No. 671,202
Int. Cl. C10m 1/16
U.S. Cl. 252—59                    11 Claims

ABSTRACT OF THE DISCLOSURE

Amorphous ethylene-propylene copolymers having a molecular weight of 10,000 to 40,000 are prepared by a hydrogen moderated polymerization process in the presence of a homogenous Ziegler-Natta catalyst system. Additions of the copolymer to lubricating oil produce compositions having an increased viscosity index and an improved shear stability.

BACKGROUND OF THE INVENTION

This invention relates to hydrocarbon polymers useful for improving the quality of lubricating oils. More particularly, it relates to amorphous ethylene-propylene copolymers which improve the viscosity index and the shear stability of lubricating oil compositions.

The rate of change of viscosity of lubricating oil with temperature is called the viscosity index or V.I. oils having a high viscosity index exhibit a small change in viscosity with temperature variation than those with a low viscosity index. In such applications as automobile and aircraft engine lubrication, where a wide range of temperature is encountered, lubricating oils having high viscosity indices are highly desirable and often critically necessary.

It is well known in the art that small quantities of long chain hydrocarbon polymers will substantially increase the V.I. of petroleum lubricants. In addition to improving the V.I., these polymers have a thickening effect on the base oil thereby increasing the viscosity of the blend. Long chain polymers effective as viscosity index improvers include polymers of isobutylene and similar aliphatic hydrocarbons, olefins, styrene, alkylstyrene, acrylates, methylacrylates and esters. Copolymers of these materials are also effective V.I. improvers.

Lubricating oils containing high molecular weight copolymers are often subjected to high shear rates in lubricating service. When the lubricating oil additive is mechanically unstable, this high shear will cause a viscosity loss and other undesirable effects in the oil blend.

In preparing polymers and copolymers of hydrocarbons, it is known that "Ziegler-Natta" type catalysts will normally produce polymers and copolymers which are partially or completely soluble in hydrocarbon solvents and oils. These polymers often possess a stereo specificity which produces a crystalline structure. It is also known that quantities of hydrogen added to the monomers to be polymerized will effectively moderate the reaction.

Copolymers of ethylene and propylene are known in the art and have been prepared by many catalyst systems including the Ziegler-Natta type. Although these polymers are normally crystalline in nature, they may be prepared in an amorphous form under certain conditions. Further, it is known that these amorphous ethylene-propylene copolymers will impart V.I. improvement properties to a lubricating oil, particularly when the molecular weight of the copolymer is over 50,000. These copolymers also impart a degree of shear stability to the lubricating oil when the ethylene content comprises 40 to 80 percent of the polymer.

SUMMARY OF THE INVENTION

We have found a process for preparing an amorphous ethylene-propylene copolymer having a molecular weight less than 40,000 which added to lubricating oil produces a substantially shear stable blend with an improved viscosity index. In particular we have found that amorphous copolymers of ethylene and propylene, useful as lube oil V.I. additives, may be prepared by using a homogenous Ziegler-Natta catalyst and adding hydrogen gas to the reaction mixture to moderate the polymerization reaction.

DESCRIPTION OF PREFERRED EMBODIMENTS

In general, the ethylene-propylene copolymers of our invention are prepared at moderate temperatures and pressures in the presence of hydrogen gas and a solvent-soluble, Ziegler-Natta catalyst. The copolymers produced by this process have a number average molecular weight between 10,000 and 40,000, a propylene content as measured by nuclear magnetic resonance (NMR) of 20 to 70 mole percent and exhibit an amorphous structure. These copolymers are useful as lubricating oil V.I. improvement additives, with those having a number average molecular weight of 20,000 to 35,000 being particularly preferred. In addition, these copolymers will impart improved shear stability to the lubricating oil particularly if the molecular weight distribution of the copolymer is narrow, i.e., the ratio of weight average molecular weight to number average molecular weight is less than about 5, preferably less than about 4. Although ethylene-propylene copolymers are known in the prior art and have been used as lubricating oil viscosity index improvers, the copolymers of our invention are distinguishable therefrom in that they are amorphous, have a lower molecular weight and a narrow molecular weight distribution.

The reaction is conducted by saturating an inert solvent with a mixture of ethylene, propylene and hydrogen. After reducing the temperature of the solution below ambient, additional quantities of the gas mixture are continuously introduced into the solution and an inert solvent containing a Ziegler-Natta catalyst is slowly added. The polymerization commences, as evidenced by a slow increase in temperature. Following the completion of the reaction the copolymer is precipitated by the addition of an alcohol, recovered from the reaction solution and dried.

We have found that gaseous mixtures of propylene and ethylene in mole ratios of 0.2:1.0 to 10.0:1.0 produce satisfactory copolymers although the preferred range is 0.6:1.0 to 4.0:1.0. Hydrogen gas is added to the olefins to produce a total gaseous mixture containing 0.05 to 15.0 mole percent hydrogen with 1 to 10 mole percent being preferred. We have found that any inert aliphatic, aromatic or halogenated hydrocarbon is a satisfactory solvent for the polymerization—by inert solvent, we mean one which does not deactivate the catalyst. Polyhalo alkanes, such as $CCl_4$, $CBr_4$ and $CH_2Cl_2$, are particularly useful, with the preferred inert solvents being carbon tetrachloride, n-heptane, benzene and cyclohexane. A reaction temperature between −40 and 250° F. is operable, however, we prefer a temperature between 35 and 70° F. Although operating pressures of 0 to 300 p.s.i.g. are satisfactory, 0 to 50 p.s.i.g. is preferred. The reaction time or contact time usually varies between 20 minutes and 2 hours but is selected to produce a copolymer having the desired molecular weight and molecular weight distribution.

The useful copolymers are amorphous and have a 10,000 to 40,000 number average molecular weight with the quantity of propylene in the copolymer being between 20 and 70 mole percent. The copolymers have a narrow molecular weight distribution, i.e., a ratio of weight average molecular weight to number average molecular weight, $\overline{M}_w/\overline{M}_n$, of less than about 5. Those amorphous copolymers which are especially useful for improving the viscosity index and shear stability of lubricating oil compositions have a number average molecular weight of 20,000 to 35,000, a propylene content between 25 and 55 mole percent and a molecular weight distribution, $\overline{M}_w/\overline{M}_n$, of less than about 4.

Although there are many Ziegler-Natta catalyst systems which will cause olefins to polymerize, those which we employ in our process are those which will produce amorphous copolymers of ethylene and propylene. Therefore, none of the heterogeneous catalyst systems may be effectively employed to prepare our copolymers—a solvent soluble catalyst system must be employed.

Ziegler-Natta catalysts comprise compounds containing certain strongly electropositive transition metals such as titanium, vanadium, chromium, and zirconium at a level of oxidation lower than the maximum together with compounds containing carbon, hydrogen or halogen linked to a metal from Groups I to III of the Periodic Table. The classic example is the precipitate formed by the interaction of titanium tetrachloride and triethylaluminum in normal heptane. The titanium is reduced to a low valence state to produce a system which is catalytically active for the polymerization of ethylene at ordinary temperatures and pressures. These catalyst systems normally produce polymers which have a strong tendency to crystallize. It is possible however to produce a randomly distributed polymer, the so-called atatic type, under proper conditions.

The Ziegler-Natta catalyst systems which we find useful in producing our polymers comprise two components dissolved in an inert solvent. The first component is a hydrocarbyl vanadate (which can also be termed a "trihydrocarboxy vanadyl" or a "vanadyl trihydrocarboxide"), a hydrocarboxy vanadyl halide or a vanadyl trihalide. Representative first components include tri-n-butyl orthovanadate, triethyl orthovanadate, triphenyl orthovanadate, tridodecyl orthovanadate, dimethyldodecyl orthovanadate, diethyloxy vanadyl chloride, n-butoxyvanadyl dichloride, vanadyl trichloride, etc. Useful first components may be selected from compounds having the formula

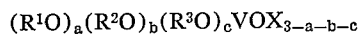

wherein $R^1$, $R^2$ and $R^3$ are $C_1$ to $C_{14}$ hydrocarbyl radicals, either alkyl or aryl, X is a halide selected from bromine, chlorine or iodine and subscripts $a$, $b$ and $c$ are 0 or 1. The second component of the catalyst is an alkylaluminum halide. Representative second components include ethylaluminum dichloride, diethylaluminum chloride, didodecylaluminum chloride, diisopropylaluminum bromide, n-hexylaluminum dichloride, di-n-butylaluminum iodide, etc., including mixtures thereof such as a mixture of ethylaluminum dichloride and diethylaluminum chloride which in an equimolar mixture is commonly called ethylaluminum sesquichloride. Useful second components may be selected from compounds having the formula $R^4_d AlY_{3-d}$ wherein $R^4$ is a $C_1$–$C_{14}$ alkyl radical, Y is a halide selected from bromine, chlorine or iodine and subscript $d$ is 1 or 2.

The catalyst systems we particularly prefer employ tri-n-butyl orthovanadate as the first component and ethylaluminum dichloride, diethylaluminum chloride or ethylaluminum sesquichloride as the second component. Those skilled in the art will appreciate that the closely related homologues of these compounds will also be preferred.

The catalyst system is prepared by adding the components to the solvent or mixing the components in a mole ratio of second component to first component of 2:1 to 50:1.

In general, we find that within the range of operating conditions listed above, production of the higher molecular weight copolymers is favored by a low reaction temperature, small amount of catalyst and minimum amount of hydrogen; conversely, lower molecular weight copolymers are produced with a high reaction temperature, large amount of catalyst and maximum amount of hydrogen. Those skilled in the art will realize that minor adjustments of operating conditions may be necessary with particular feedstocks to produce a copolymer having a specific molecular weight.

The copolymers may be blended into the lubricating oil by any of the methods well known in the art. One technique we find particularly useful is to dissolve the desired amount of polymer in benzene, add this solution to the lubricating oil blend and strip the resultant mixture free of the benzene solvent.

The copolymers of our invention improve the viscosity index and shear stability of the various lubricating oil products by adding a minor amount of the copolymer, that is, from 0.5 to 5 weight percent of the resultant mixture. The exact quantity to be used can readily be determined by those skilled in the art depending upon the viscosity index improvement desired, the shear stability required and the lubricating oil being utilized. Lubricating oils derived from paraffinic, naphthenic or asphaltic crudes or mixtures thereof may be improved by additions of the copolymers of our invention. Paraffinic hydrocarbon lubricating oils having a viscosity index range, for example, of 80–110 are particularly improved by the incorporation of these ethylene-propylene copolymers.

Our invention is illustrated in detail by the following examples.

EXAMPLE I

This example illustrates the method of preparing the amorphous ethylene-propylene copolymers of our invention.

About 500 milliliters of $CCl_4$ were saturated at 40° F. with a gaseous feedstock containing 6.8 mole percent hydrogen with the balance a mixture of ethylene and propylene in a mole ratio of propylene to ethylene of 1.3:1.0. A stirred reactor containing this solution was cooled with an ice bath while additional quantities of the above gaseous mixture were continuously introduced into the solution at a 1 liter per minute flow rate. One and one-half milliliters of a 20 weight percent solution of diethylaluminum chloride in heptane and one-half milliliter of a 20 weight percent solution of tri-n-butyl vanadate in heptane were then added. The polymerization started and the temperature rose from 40° to about 65° F. in about twenty minutes. At this point additional catalyst was added, one and one-half milliliters of the diethylaluminum chloride solution and one-half milliliter of tri-n-butyl vanadate solution. The reaction continued for an additional ten minutes until the reaction temperature declined to 50° F. The polymer was washed with dilute HCl and the solvent was removed by stripping to yield 23.3 grams of product.

The polymer was amorphous by infrared spectroscopy, had a number average molecular weight of 29,100, a molecular weight distribution, $\overline{M}_w/\overline{M}_n$, of below 4 and a propylene content of 44 mole percent as determined by nuclear magnetic resonance (NMR).

EXAMPLE II

In a method similar to Example I, another amorphous ethylene-propylene copolymer was prepared by a hydrogen moderated reaction. The procedure was substantially the same as in Example I. Two liters of cyclohexane served as the reaction solvent. The ratio of propylene to ethylene in the feed was 0.95 and the hydrogen concentration was 4.6 mole percent. The catalyst comprised 40 milliliters of the 20 weight percent heptane solution of diethylaluminum chloride and 3 milliliters of the 20 weight percent heptane solution of tri-n-butyl vanadate. 123 grams of copolymer were recovered having a number average molecular weight of 24,000, a propylene content of 37 mole percent and a molecular weight distribution as measured by $\bar{M}_w/\bar{M}_n$ of 3.0.

thickening power were also similar but the shear stability was substantially less as shown by the test results presented in Table II below.

TABLE II

| | Composition | Wt. percent polymer | VI | Viscosity, SSU 100° F. | Viscosity, SSU 210° F. | FISST percent Vis. Loss 100° F. | FISST percent Vis. Loss 210° F. |
|---|---|---|---|---|---|---|---|
| Blend No.: | | | | | | | |
| B | Blend A plus Ex. I polymer | 1.5 | 171 | 364 | 68.8 | 0.0 | 1.6 |
| D | Blend A plus Ex. IV polymer | 1.5 | 173 | 348 | 67.5 | 14.1 | 10.5 |

EXAMPLE III

The viscosity index improvement qualities of the copolymers of our invention and their superior shear stability were demonstrated by adding 1.5 weight percent of these copolymers to a lubricating oil composition. The results are set forth in Table I below.

The shear stability of the lubricating oil blends was demonstrated in a Fuel Injector Shear Stability Test (FISST). This test is described in Paper No. 57A entitled "Simplified Shear Stability Testing" by R. Rawson, presented at the June 1958 meeting of the Society of Automotive Engineers. In this test the shear stability is reported as the percentage loss in viscosity of the oil under test after a 100 cc. sample has been subjected to the severe shearing action of being pumped for twenty passes through a Bosch fuel injector nozzle.

EXAMPLE V

The advantage of employing an ethylene-propylene copolymer with a narrow molecular weight distribution was demonstrated by comparing the copolymer of Example II with a similar ethylene-propylene copolymer having a significantly broader molecular weight distribution. The copolymer properties and the test results on lubricating oil compositions containing them are set forth in Table III below.

TABLE III

| Copolymer properties | | | Test blends | | | | | | | |
|---|---|---|---|---|---|---|---|---|---|---|
| Copolymer | Molec. weight, $\bar{M}_n$ | Molec. wt. dist., $\bar{M}_w/\bar{M}_n$ | Blend No. | Composition | Wt. percent polymer | VI | Viscosity, SSU 100° F. | Viscosity, SSU 210° F. | FISST Percent vis. loss 110° F. | FISST Percent vis. loss 210° F. |
| Ex. II | 23,700 | 3.0 | C | Blend A plus Ex. II polymer | 1.5 | 149 | 326 | 61.4 | 4.0 | 2.6 |
| Ex. V | 22,600 | 13.7 | E | Blend A plus Ex. V polymer | 1.5 | 171 | 522 | 84.7 | 39.1 | 28.4 |

The Example II copolymer has a substantially lower $\bar{M}_w/\bar{M}_n$ ratio and exhibits a shear stability superior to that of the Example V copolymer.

TABLE I

| | Composition | VI | Viscosity, SSU 100° | Viscosity, SSU 210° | FISST percent Vis. Loss 100° F. | FISST percent Vis. Loss 210° F. |
|---|---|---|---|---|---|---|
| Blend No: | | | | | | |
| A | Lubricating oil | 114 | 165 | 45.1 | 0.0 | 0.0 |
| B | Blend A plus Example I copolymer | 171 | 364 | 68.8 | 0.0 | 1.6 |
| C | Blend A plus Example II copolymer | 149 | 326 | 71.4 | 4.0 | 2.6 |

EXAMPLE IV

The advantage of moderating the polymerization with hydrogen was demonstrated by preparing an ethyl-propylene copolymer in a method substantially the same as that of Example I except that the feed stream contained no hydrogen. The amorphous polymer produced was similar to that of Example I having a number average molecular weight of 23,900 and a propylene content of 45 mole percent. The viscosity index improvement properties and

EXAMPLE VI

The shear stability of the copolymers of our invention was compared to that of other polymeric lube oil additives and ethylene-propylene copolymers having significantly higher molecular weights.

The properties of the polymers and the results of the tests on lube oil blends containing them as set forth in Table IV below.

TABLE IV.—POLYMER PROPERTIES.

| Polymer No. | Description | Molec. wt., $\bar{M}_n$ | Other |
|---|---|---|---|
| Ex. I | Amorphous ethylenepropylene copolymer of invention | 29,100 | 44 mole percent $C_3$. |
| Ex. II | do | 23,700 | 36 mole percent $C_3$. |
| Ex. VI M | Polymethacrylate ester | (¹) | |
| Ex. VI N | do | (²) | |
| Ex. VI O | Amorphous ethylenepropylene copolymer | 58,300 | 47 mole percent $C_3$. |
| Ex. VI P | do | 64,600 | 30 mole percent $C_3$. |

¹ About ½ million.
² About 1 million.

TEST BLENDS

| Blend No.: | Composition Blend A plus: | Wt. percent polymer | VI | Viscosity, SSU 100° F. | Viscosity, SSU 210° F. | FISST Percent Vis. Loss 100° F. | FISST Percent Vis. Loss 210° F. |
|---|---|---|---|---|---|---|---|
| B | Ex. I polymer | 1.5 | 171 | 364 | 68.8 | 0.0 | 1.4 |
| C | Ex. II polymer | 1.5 | 149 | 326 | 61.4 | 4.0 | 2.8 |
| F | Ex. VI M polymer | 2.25 | 197 | 264 | 62.2 | 18.2 | 13.4 |
| G | Ex. VI N polymer | 1.8 | 222 | 238 | 62.2 | 22.6 | 20.3 |
| H | Ex. VI O polymer | 1.5 | 175 | 671 | 101.0 | 41.2 | 29.6 |
| J | Ex. VI P polymer | 1.5 | 181 | 743 | 110.6 | 50.8 | 28.6 |

It is seen from these tests that the amorphous ethylene-propylene copolymers of our invention are not only effective viscosity index improvers but also exhibit a shear stability not evidenced by other lubricating oil polymeric additives.

I claim:

1. A lubricating oil compositon comprising a major portion of a lubricating oil and a minor portion, sufficient to impart viscosity improvement properties thereto, of an ethylene-propylene copolymer having an amorphous structure, a number average molecular weight between 10,000 and 40,000, a propylene content of 20 to 70 mole percent and a $\overline{M}_w/\overline{M}_n$ of less than about 5.

2. A lubricating composition according to claim 1 wherein the minor portion is 0.5 to 5.0 weight percent of the lubricating composition.

3. A lubricating composition comprising a major portion of a lubricating oil and a minor portion, sufficient to impart viscosity index improvement properties thereto, of an amorphous ethylene-propylene copolymer prepared by a process which comprises:

contacting a feed mixture comprising ethylene, propylene and hydrogen in an inert solvent selected from the group consisting of aliphatic, aromatic or halogenated hydrocarbons under polymerizing conditions with a homogenous Ziegler-Natta catalyst, the feed mixture comprises propylene and ethylene in a mole ratio of 0.2:1.0 to 10.0:1.0 and a hydrogen concentration of 0.05 to 15 mole percent;

the polymerizing conditions comprise a reaction temperature of −40 to 250° F., an operating pressure of 0 to 300 p.s.i.g. and a contact time sufficient to produce a copolymer having a number average molecular weight of 10,000 to 40,000 and a $\overline{M}_w/\overline{M}_n$ of less than about 5; and the homogenous catalyst comprises two components, the first component having the formula $$(R^1O)_a(R^2O)_b(R^3O)_cVOX_{3-a-b-c}$$

and the second component having the formula $R^4_dAlY_{3-d}$ wherein $R^1$, $R^2$ and $R^3$ are $C_1$-$C_{14}$ alkyl or aryl radicals; $R^4$ is a $C_1$-$C_{14}$ alkyl radical; X and Y are bromine, chlorine or iodine; $a$, $b$ and $c$ are 0 or 1 and $d$ is 1 or 2.

4. A lubricating composition according to claim 3 wherein the minor portion is 0.5 to 5.0 weight percent of the lubricating composition.

5. A lubricating composition comprising a major portion of a lubricating oil and a minor portion, sufficient to impart viscosity improvement properties thereto, of an ethylene-propylene copolymer having an amorphous structure, a number average molecular weight between 20,000 and 35,000, a propylene content between 25 and 55 mole percent and a $\overline{M}_w/\overline{M}_n$ of less than about 4.

6. A lubricating composition according to claim 5 wherein the minor portion is 0.5 to 5.0 weight percent of the lubricating composition.

7. A lubricating composition according to claim 3 wherein the propylene-ethylene mole ratio is 0.6:1.0 to 4.0:1.0, the hydrogen concentration is 1 to 10 mole percent, the reaction temperature is 35 to 70° F., the operating pressure is 0 to 50 p.s.i.g., the contact time is sufficient to produce a copolymer having a number average molecular weight of 20,000 to 35,000 and a $\overline{M}_w/\overline{M}_o$ of less than about 4.

8. A lubricating composition according to claim 7 wherein the minor portion is 0.5 to 5.0 weight percent of the lubricating composition.

9. A lubricating composition according to claim 7 wherein $R^1$, $R^2$ and $R^3$ are n-butyl, $a$, $b$ and $c$ are 1, $R^4$ is ethyl, Y is chlorine and $d$ is 2.

10. A lubricating composition according to claim 7 wherein $R^1$, $R^2$ and $R^3$ are n-butyl, $a$, $b$ and $c$ are 1, $R^4$ is ethyl, Y is chlorine and $d$ is 1.

11. A lubricating composition according to claim 7 wherein the first component is tri-n-butyl orthovanadate and the second component is ethylaluminum sesquichloride.

References Cited

UNITED STATES PATENTS

| 2,142,980 | 1/1939 | Huijser et al. | 252—59 X |
| 2,327,705 | 8/1943 | Frolich et al. | 252—59 |
| 2,691,647 | 10/1954 | Field et al | 252—59 X |
| 3,389,087 | 6/1968 | Kresge et al. | 252—59 |

DANIEL E. WYMAN, Primary Examiner

W. J. SHINE, Assistant Examiner

PO-1050
(5/69)

UNITED STATES PATENT OFFICE
CERTIFICATE OF CORRECTION

Patent No. 3,522,180                      Dated July 28, 1970

Inventor(s) William M. Sweeney, David D. Reed and Elmer E. Schallenberg

It is certified that error appears in the above-identified patent and that said Letters Patent are hereby corrected as shown below:

Column 1, line 33, "small" should read --smaller--.

Column 2, line 58, "$CH_2CI_2$" should read --$CH_2Cl_2$--. Columns 5-6, Table I, fifth column, "71.4" should read --61.4--.

Columns 7-8, Table IV, TEST BLENDS, eighth column,

| "1.4 | should read | --1.6 |
|---|---|---|
| 2.8 | | 2.6 |
| 13.4 | | 13.8 |
| 20.3 | | 20.4 |
| 29.6 | | 29.3 |
| 28.6" | | 28.4-- |

Column 7, line 19, delete "oil". Column 8, line 32, "$\overline{M}_o$" should read --$\overline{M}_n$--.

Signed and sealed this 1st day of June 1971.

(SEAL)
Attest:

EDWARD M. FLETCHER, JR.
Attesting Officer

WILLIAM E. SCHUYLER, JR.
Commissioner of Patents

Notice of Adverse Decision in Interference

In Interference No. 98,039, involving Patent No. 3,522,180, W. M. Sweeney, D. D. Reed and E. E. Schallenberg, LUBRICATING OIL COMPOSITIONS CONTAINING AMORPHOUS ETHYLENE-PROPYLENE COPOLYMERS, final judgment adverse to the patentees was rendered Feb. 18, 1976, as to claims 1 and 2.

[*Official Gazette November 30, 1976.*]